United States Patent [19]
Yamaguchi

[11] Patent Number: 5,692,693
[45] Date of Patent: Dec. 2, 1997

[54] BACKFLASH PREVENTIVE DEVICE FOR PREVENTING OVER ROTATION OF A SPOOL FOR A FISHING REEL

[75] Inventor: Nobuyuki Yamaguchi, Tokyo, Japan

[73] Assignee: Daiwa Seiko, Inc., Tokyo, Japan

[21] Appl. No.: 414,323

[22] Filed: Mar. 31, 1995

[30] Foreign Application Priority Data

Apr. 1, 1994 [JP] Japan ................... 6-085319

[51] Int. Cl.$^6$ ..................... A01K 89/02
[52] U.S. Cl. ..................... 242/288; 242/289
[58] Field of Search ................... 242/288, 289, 242/286

[56] References Cited

U.S. PATENT DOCUMENTS

| 3,901,457 | 8/1975 | Turesson | 242/289 |
| 4,580,742 | 4/1986 | Moosberg et al. | 242/288 |
| 4,779,814 | 10/1988 | Uetsuki et al. | 242/288 |
| 4,917,321 | 4/1990 | Roberts | 242/289 |
| 4,940,194 | 7/1990 | Young | 242/288 |

FOREIGN PATENT DOCUMENTS

| 11962 | 1/1982 | Japan | 242/288 |
| 62-35334 | 9/1987 | Japan . | |
| 2-33673 | 9/1990 | Japan . | |
| 2-36389 | 10/1990 | Japan . | |
| 3-79665 | 8/1991 | Japan . | |

*Primary Examiner*—Daniel P. Stodola
*Assistant Examiner*—Emmanuel M. Marcelo
*Attorney, Agent, or Firm*—Longacre & White

[57] ABSTRACT

In a fishing reel of a double bearing type, a spool including two flanges respectively on the two sides thereof is supported between the two side plates of a reel main body in such a manner that the spool can be freely rotated when a fishline is played out, and, as a brake mechanism, the brake portion of a brake device for preventing the over-rotation of the spool by use of an eddy current caused by a magnet or by use of the centrifugal force of a brake shoe is stored and located within the fishline winding barrel portion of the spool, whereby the axial direction of a spool shaft can be reduced and thus the reel main body can be made compact.

18 Claims, 5 Drawing Sheets

BACKFLASH PREVENTIVE DEVICE FOR PREVENTING OVER ROTATION OF A SPOOL FOR A FISHING REEL

BACKGROUND OF THE INVENTION

The present invention relates to a backlash preventive device for preventing the over-rotation of a spool when a fishline is played out from a fishing reel of a double bearing type.

Conventionally, as means for preventing the over-rotation of a spool when a fishline is played out from a fishing reel of a double bearing type, there are known a device of a magnetic brake type which generates an eddy current through a magnetic action in a conductive body rotatable in linking with the spool, and a device of a centrifugal brake type which brakes the spool by use of the centrifugal force of a brake shoe rotatable in linking with the spool.

However, in the former device of a magnetic brake type, as can be seen in Japanese Utility Model Publication No. 2-33673 of Heisei, Japanese Utility Model Publication No. 2-36389 of Heisei, and Japanese Utility Model Publication No. 62-35334 of Showa, since the conductive body, which is a main component of the brake device for preventing the over-rotation of the spool, is projected outwardly in the axial direction from the flange of the spool or is formed in the axial direction integrally with the outer peripheral edge of the flange, the axial length of a spool shaft between two reel side plates is long. Also, in the latter device of a centrifugal brake type as well, as can be seen in Japanese Utility Model No. 3-79665 of Heisei, because the brake shoe is fitted on a support rod provided on a spool shaft disposed on the outside of the flange of the spool, the axial length of the spool shaft between two reel side plates is also long. That is, in both of these two conventional devices, the length of a reel main body in the spool axial direction cannot be reduced, so that the holding and operating function of the reel can be lowered.

SUMMARY OF THE INVENTION

In view of these circumstances, the present invention aims at eliminating the above drawbacks found in the conventional devices. Accordingly, it is an object of the invention to provide a backlash preventive device for a fishing reel which allows a reel main body to be made compact and thus can improve the holding and operating function of the reel in fishing and also can facilitate the portability of the reel.

In attaining the above object, according to the invention, there is provided a backlash preventive device for preventing an over-rotation of a spool rotatably supported by a fishing reel, the spool having a fishline winding barrel portion adapted to receive the fishline thereon and a pair of flanges respectively provided on ends of the fishline winding barrel portion, the fishline winding barrel portion has an inner periphery defining a hollow space. The backlash preventive device includes: first and second brake portions for cooperatively producing a braking force applied to the spool, the first and second brake portions being stored within the hollow space.

The above-mentioned brake device for preventing the over-rotation of the spool may be of a magnetic brake type which makes use of an eddy current of a magnet, a centrifugal brake type which makes use of the centrifugal force of a brake shoe, or a type which makes use of the magnetic eddy current and brake shoe centrifugal force in combination. And, in the respective brake devices, it is also possible to provide adjust means which can be used to adjust the brake force.

According to the present invention, the brake portions are stored in the fishline winding barrel portion of the spool to thereby be able to reduce the axial length of the spool shaft. Thus, the reel main body can be made compact.

DETAILED DESCRIPTION OF THE PREFERRED EMBODIMENTS

Now, description will be given below in detail of the embodiments of a backlash preventive device according to the invention.

Figure 1:
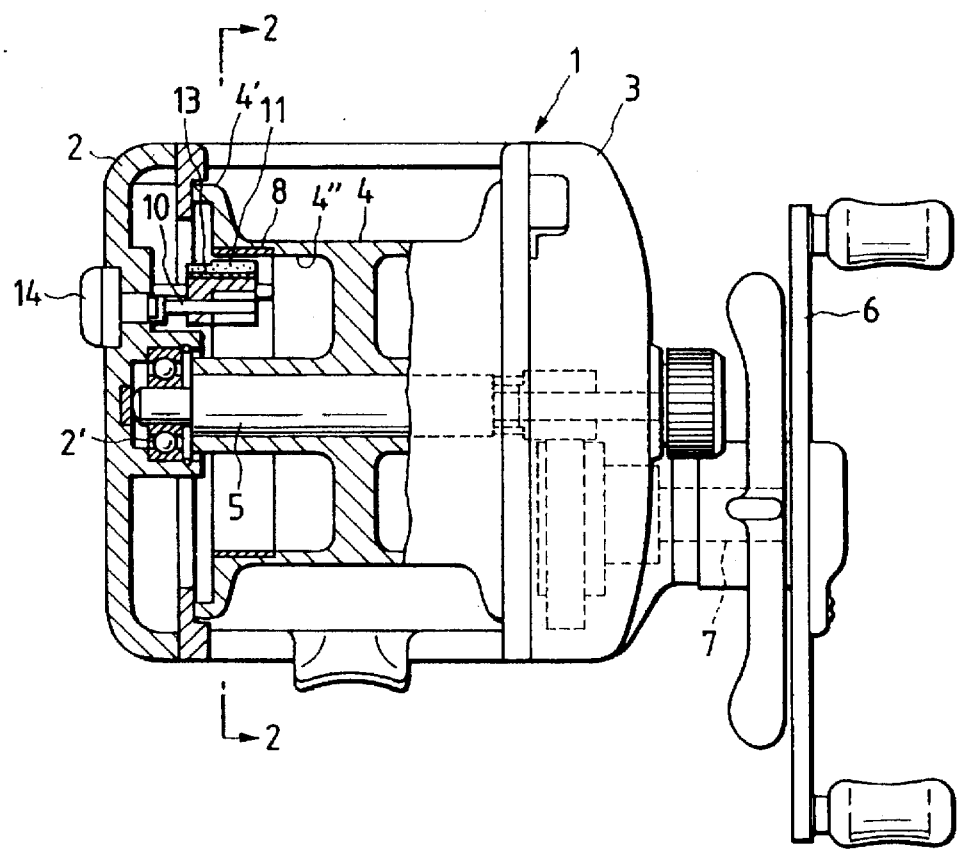
FIG. 1 is a partially cutaway front view of a first embodiment of a backlash preventive device according to the invention.
Figure 2:
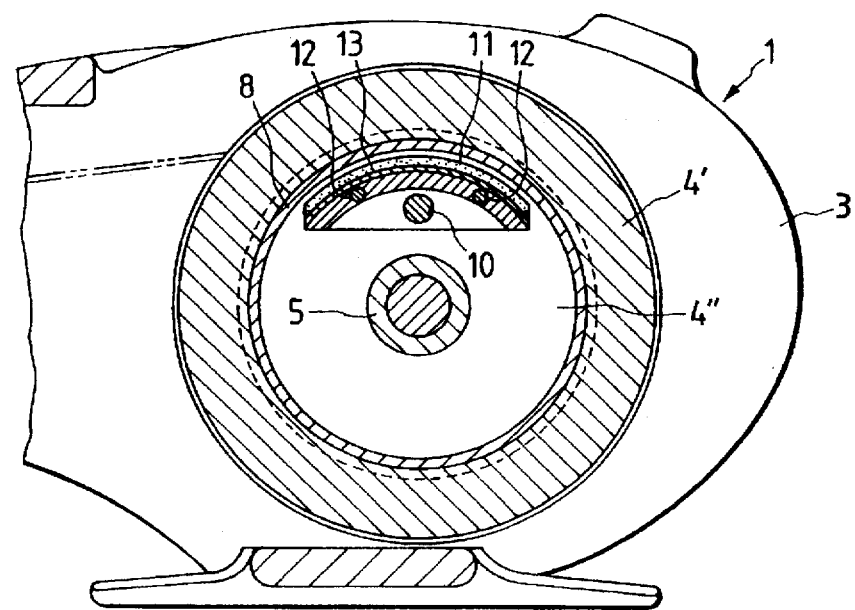
FIG. 2 is a section view taken along the line 2—2 shown in FIG. 1.

In FIGS. 1 and 2, there is shown a first embodiment of a backlash preventive device according to the invention. In the first embodiment, a spool shaft 5, to which a spool 4 having two flanges 4' respectively formed on the two sides thereof is fixed, is supported between the two side plates 2 and 3 of a reel main body 1 of a reel of a double bearing type in such a manner that the spool shaft 5 is linked with a handle shaft 7 having a handle 6 in a known manner through a linking mechanism and a clutch mechanism and also that the spool shaft 5 can be freely rotated due to the disengagement of the clutch mechanism when a fishline is played out, and a conductive body 8 is fitted with the inner peripheral surface of a fishline winding barrel portion 4" of the spool 4.

Also, a controlling threaded rod 10 is rotatably supported by the side plate 2, an arc-shaped support member 13, which has a magnet 11 on the outer surface thereof and is slidably fitted with a guide rod 12 provided in the side plated 2, is threadedly engaged with the controlling threaded rod 10 and is formed such that it can be freely slided in the spool axial direction by rotating a knob 14 by use of the controlling threaded rod 10, and the position of the magnet 11 in the axial direction thereof with respect to the conductive body 8 is adjusted to control the intensity of an eddy current caused by the magnet 11, thereby being able to control the spool brake force. Therefore, when the support member 13 is positioned deeply into the fishline winding barrel portion 4" by use of the knob 14 of the controlling threaded rod 10, the spool 4 can be braked with the greatest brake force and the brake force can be gradually weakened by moving the position of the support member 13 toward the side plate 2 by means of the knob 14.

Figure 3:
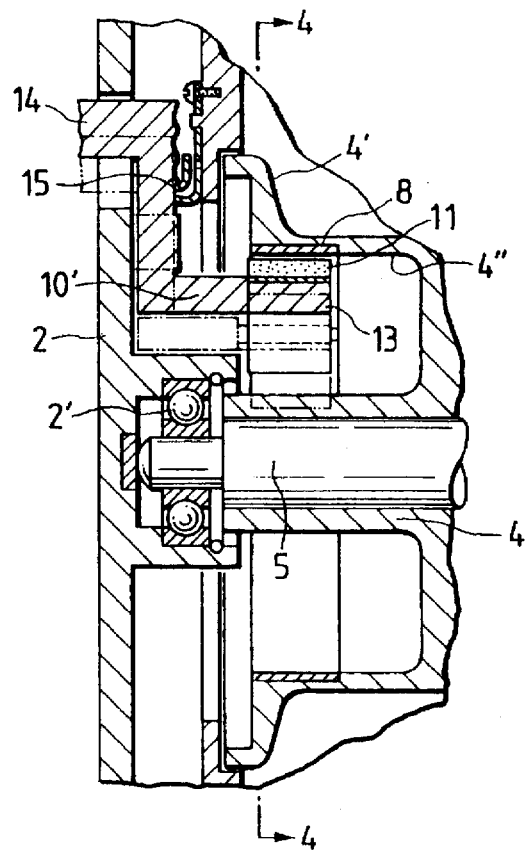
FIG. 3 is a longitudinal section view of the main portions of a second embodiment of a backlash preventive device according to the invention.
Figure 4:
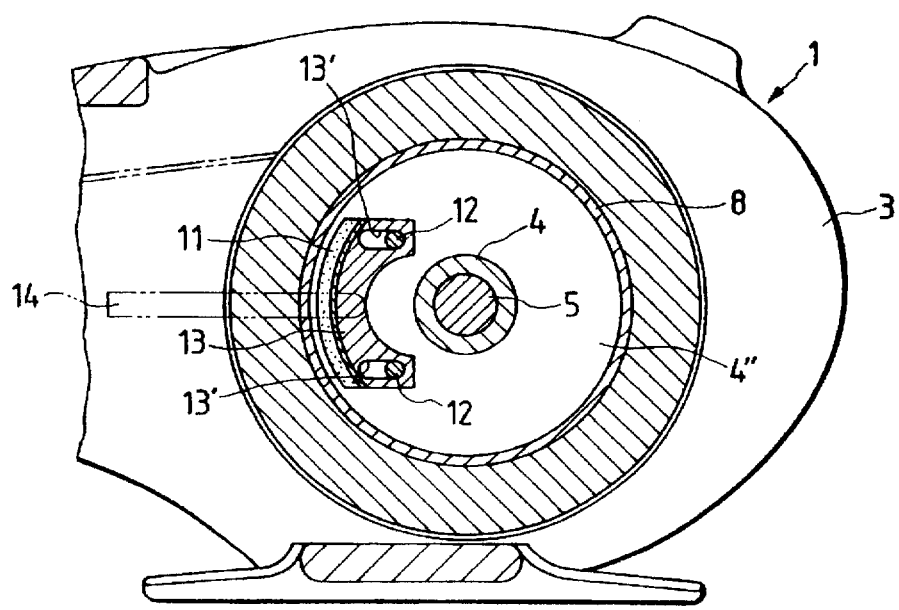
FIG. 4 is a section view taken along the line 4—4 shown in FIG. 3.

Now, in FIGS. 3 and 4, there is shown a second embodiment of a backlash preventive device according to the invention. In the second embodiment, the support member 13 is mounted on the guide rod 12 through an elongated hole 13' formed in the support member 13 such that it can be freely moved in the radial direction by a control rod 10' held by a spring 15, and the distance between the magnet 11 and conductive body 8 can be adjusted by means of the knob 14, thereby being able to control the brake force.

Figure 5:
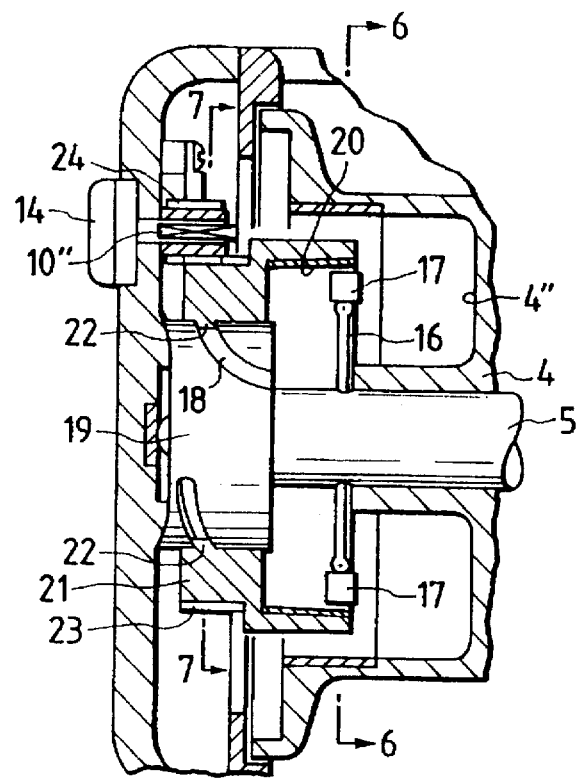
FIG. 5 is a longitudinal section view of the main portions of a third embodiment of a backlash preventive device according to the invention.
Figure 6:
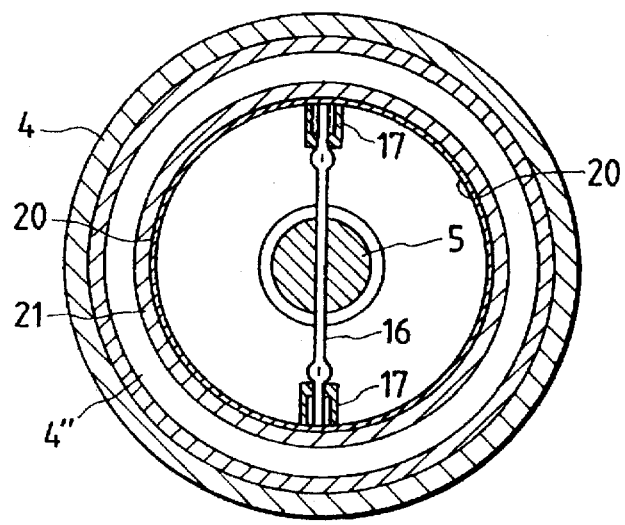
FIG. 6 is a section view taken along the line 6—6 shown in FIG. 5.
Figure 7:
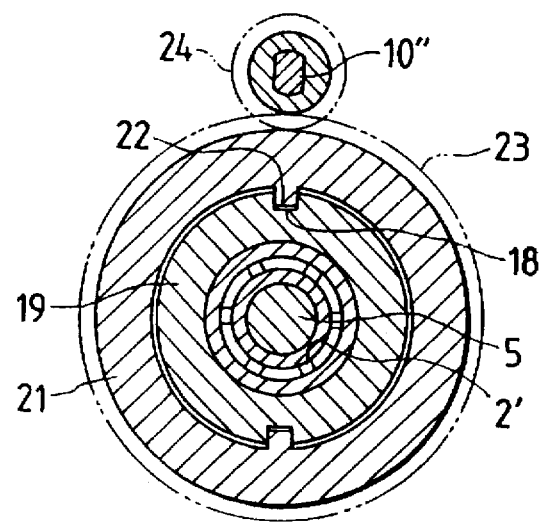
FIG. 7 is a section view taken along the line 7—7 shown in FIG. 5.

Now, in FIGS. 5 to 7, there shown a third embodiment of a backlash preventive device according to the invention, in which the centrifugal force is used to have a brake shoe 17 serve as brake means. In the third embodiment, a brake shoe 17 is movably fitted on a support rod 16 radially protruded from a spool shaft 5 and disposed within the fishline winding barrel portion 4" of a spool 4. In the central portion of the side plate 2, there is projectingly provided a support cylinder 19 which has a cam groove 18 formed in the peripheral surface thereof and on which a braking annular member 21 is fitted. The braking annular member 21 is formed with a truncated circular cone hole portion which is gradually spread toward the spool 4 and on which a brake collar is fitted. An engaging projection 22 provided on the fitting portion of the braking annular member 21 is engaged with the cam groove 18, and a teeth portion 23 formed on the outer peripheral surface of the fitting portion of the braking annular member 21 is meshed with a control rod 10" having a knob 14. In this structure, by moving the truncated circular hole portion of the braking annular member 21 by means of rotation of the knob 14, the outward moving position of the brake shoe 17 during the rotation of the spool is controlled far or near from the spool shaft to thereby control the centrifugal force of the brake shoe 17, thereby being able to control the magnitude of the brake force applied to the spool 4.

Figure 8:
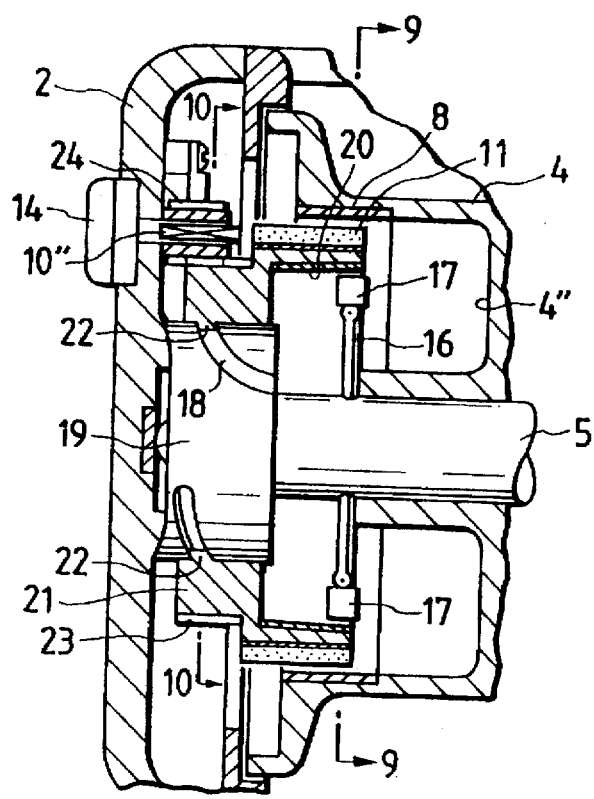
FIG. 8 is a longitudinal section view of the main portions of a fourth embodiment of a backlash preventive device according to the invention.
Figure 9:
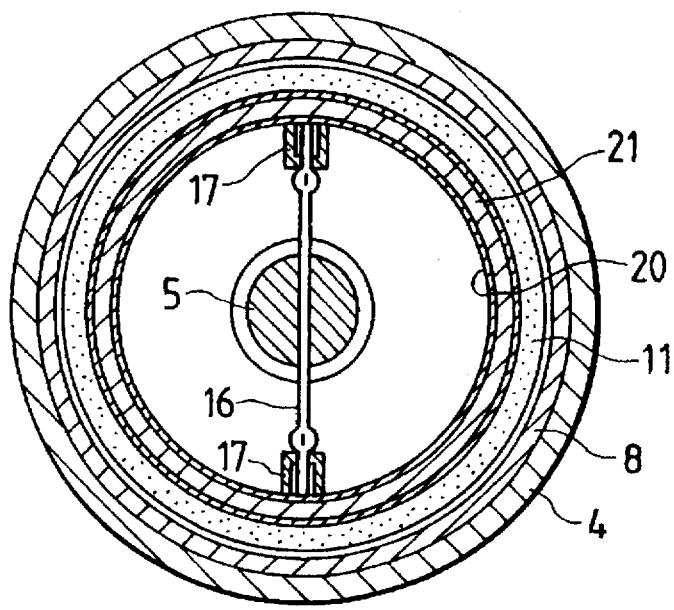
FIG. 9 is a section view taken along the line 9—9 shown in FIG. 8.
Figure 10:
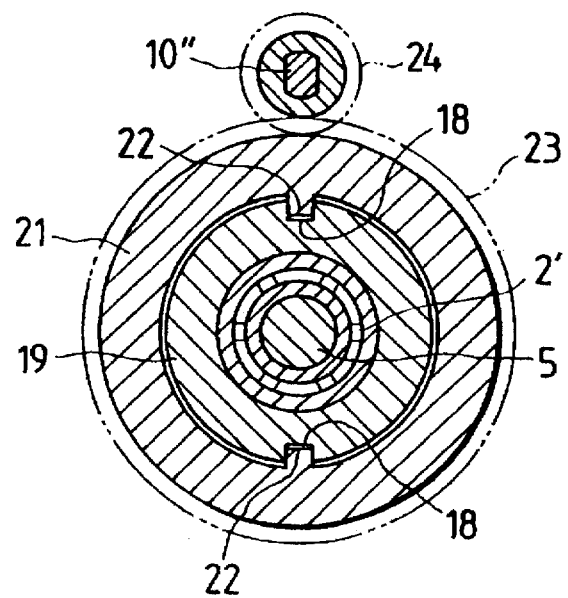
FIG. 10 is a section view taken along the line 10—10 shown in FIG. 8.

Next, in FIGS. 8 to 10, there is shown a fourth embodiment of a backlash preventive device according to the invention. In the fourth embodiment, a magnet 11 is disposed in the outer peripheral cylindrical portion of the truncated circular cone hole portion formed in the third embodiment and a conductor body 8 is disposed on the inner peripheral surface of the fishline winding barrel portion 4" of the spool 4, so that both an eddy current caused by the magnet 11 and the centrifugal force of the brake shoe 17 are utilized to brake the spool 4. According to this structure, the characteristic of a magnetic brake system is used in the low rotation area of the spool and the characteristic of the centrifugal brake system is used in the high rotation area of the spool, thereby being able to prevent the backlash of the reel more efficiently as well as to control the brake actions of the two systems.

According to the invention, due to the fact that the brake portion of the brake device for preventing the over-rotation of the spool is stored in the fishline winding barrel portion of the spool to thereby be able to make effective use of the limited space of the reel main body, the axial length of the spool shaft can be reduced to thereby make the reel main body compact. This not only can improve the holding and operating function of the reel main body such as the fishline take-up, play-out and striking operations to be performed in fishing, but also can facilitate the carrying of the reel.

Also, according to the invention, even when the magnet brake system effective for a brake action in the low rotation area of the spool is used in combination with the centrifugal brake system effective for a brake action in the high rotation area of the spool, the brake portions of the brake devices of the two systems can be stored and located within the fishline winding barrel portion of the spool, so that, while such combined use of the two brake systems prevents the reel main body from increasing in size, a spool braking action due to the backlash of the fishline can be carried out more efficiently.

What is claimed is:

1. A backlash preventive device for preventing over rotation of a spool rotatably supported by a fishing reel, said spool having a fishline winding barrel portion adapted to receive said fishline thereon and a pair of flanges respectively provided on ends of said fishline winding barrel portion, said fishline winding barrel portion having an inner periphery defining a first hollow space positioned between said ends, said backlash preventive device comprising:

a brake member which substantially extends into said hollow space for cooperatively producing a braking force of specific magnitude applied to said spool, said brake member being substantially stored within said hollow space.

2. The backlash preventive device as set forth in claim 1, wherein said brake member includes a conductive body and a magnet to brake the rotation of said spool using an eddy current.

3. The backlash preventive device as set forth in claim 2, wherein said conductive body is fixed to said inner periphery of said fishline winding barrel portion, and said magnet is fixedly provided on a portion of said brake member projecting into said hollow space to face with said conductive body.

4. The backlash preventive device according to claim 1, wherein said brake member includes an annular collar, and said backlash preventive device further comprises; a brake shoe adapted to contact with said annular collar by a centrifugal force when said spool is rotated.

5. A backlash preventive device as set forth in claim 4, wherein said annular collar is fixedly provided on a portion of said fishing reel projecting into said hollow space, and said brake shoe is movably provided on a support rod radially projecting from a spool shaft rotatable in linking with said spool.

6. A backlash preventive device as set forth in claim 4, further comprising:

a conductive body and a magnet relatively rotatable to each other in linking with the rotation of said spool to cooperatively produce a second braking force applied to said spool using an eddy current, wherein said conductive body and said magnet are stored within said hollow space.

7. The backlash preventive device according to claim 1, further comprising:

means for moving said brake member in an axial direction of said spool.

8. The backlsash device according to claim 1, wherein said hollow space is at least partially located between a spool shaft and a portion of said fishline winding barrel portion having a minimal diameter.

9. A backlash preventive device for preventing over rotation of a spool rotatably supported by a fishing reel, said spool having a fishline winding barrel portion having an inner periphery defining a first hollow space, said backlash preventive device comprising:

a brake member having an annular extension substantially disposed within said hollow space, said annular extension having a brake lining disposed on an inner peripheral surface and a magnet disposed on an outer peripheral surface;

a conductive body disposed on said inner periphery of said fishline winding barrel, wherein relative rotation between said brake member and said fishline winding barrel produces a first braking force to inhibit over rotation of said spool;

a brake shoe adapted to contact said brake lining by centrifugal force when said spool is rotated thereby producing a second braking force to inhibit over rotation of said spool; and a means to axially displace said brake member to vary the amount that said annular extension extends into said hollow portion;

wherein said first and second braking forces vary in proportion to the amount that said annular extension extends into said hollow portion.

10. A backlash preventive device according to claim 9, wherein said means to axially displace said brake member comprises;

an adjustment knob rotatably supported to a side plate of said fishing reel, said adjustment knob having a threaded rod extending into and engaging a threaded recess in said brake member, wherein when said adjustment knob is rotated said brake member is axially displaced with respect to said spool.

11. A backlash preventive device according to claim 9, wherein said means to axially displace said brake member comprises;

an adjustment knob rotatably supported to a side plate of said fishing reel, said adjustment knob fixedly attached to a gear which engages a corresponding gear portion of said brake member such that upon rotation of said adjustment knob, said brake member rotates about its axis;

a cam having a groove;

wherein said brake member has a projection for engaging said groove of said cam such that when said cam is rotated said brake member is displaced in an axial direction with respect to said spool.

12. The backlsash device according to claim 9, wherein said hollow space is at least partially located between a spool shaft and a portion of said fishline winding barrel portion having a minimal diameter.

13. A backlash preventive device for preventing over rotation of a spool rotatably supported by a fishing reel, said spool having a substantially cylindrical fishline winding barrel portion adapted to receive said fishline thereon and a pair of flanges respectively provided on ends of said fishline winding barrel portion, said fishline winding barrel portion having an inner periphery positioned between said ends defining a first hollow space, said backlash preventive device comprising:

a brake member which substantially extending into said hollow space, said brake member having a magnet disposed on an outer peripheral surface extending into said hollow space;

a conductor body disposed on said inner periphery of said fishline winding barrel such that said conductor body and said magnet face each other over a specific area;

an adjustment knob rotatably supported on a side plate of said fishing reel, said adjustment knob engaging said braking member such that when said adjustment knob is rotated said brake member is axially displaced with respect to said spool thereby varying the amount said brake member extends into said hollow space and thereby varying the specific area that said magnet faces said conductor body;

wherein when said spool is rotated a braking force is produced by an eddy current produced by said magnet, said braking force being varied proportional to the axial displacement of said braking member.

14. The backlsash device according to claim 13, wherein said hollow space is at least partially located between a spool shaft and a portion of said fishline winding barrel portion having a minimal diameter.

15. A backlash preventive device for preventing over rotation of a spool rotatably supported by a fishing reel, said spool having a fishline winding barrel portion adapted to receive said fishline thereon and a pair of flanges respectively provided on ends of said fishline winding barrel portion, said fishline winding barrel portion having an inner periphery defining a first hollow space, said backlash preventive device comprising:

first and second brake portions for cooperatively producing a braking force of specific magnitude, applied to said spool, said one of said brake portions being axially displaceable with respect to said spool, wherein said magnitude of said braking force is proportional to the axial displacement of said one of said braking members, and each of said first and second brake portions being substantially stored within said hollow space.

16. The backlsash device according to claim 15, wherein said hollow space is at least partially located between a spool shaft and a portion of said fishline winding barrel portion having a minimal diameter.

17. A backlash preventive device for preventing over rotation of a spool rotatably supported by a fishing reel, said spool having a fishline winding barrel portion adapted to receive said fishline thereon and a pair of flanges respectively provided on ends of said fishline winding barrel portion, said fishline winding barrel portion having an inner periphery defining a first hollow space, said backlash preventive device comprising:

a brake member which substantially extends into said hollow space for cooperatively producing a braking force of specific magnitude applied to said spool, said brake member being axially displaceable with respect to said spool to vary the amount that said brake member extends into said hollow space, wherein said magnitude of said braking force is proportional to the amount that said brake member extends into said hollow space said first and second brake portions being stored within said hollow space.

18. The backlsash device according to claim 17, wherein said hollow space is at least partially located between a spool shaft and a portion of said fishline winding barrel portion having a minimal diameter.

* * * * *